United States Patent
Baurmeister et al.

(10) Patent No.: US 6,271,023 B1
(45) Date of Patent: Aug. 7, 2001

(54) MODULE MADE OF AT LEAST TWO-TYPE HOLLOW FIBRES, AND PRODUCTION OF SAME

(75) Inventors: Ulrich Baurmeister, Wuppertal; Klaus Schneider; Rudolf Wollbeck, both of Erlenbach, all of (DE)

(73) Assignee: Akzo Nobel N.V., Arnhem (NL)

(*) Notice: Subject to any disclaimer, the term of this patent is extended or adjusted under 35 U.S.C. 154(b) by 0 days.

(21) Appl. No.: 09/355,745

(22) PCT Filed: Jan. 31, 1998

(86) PCT No.: PCT/EP98/00516

§ 371 Date: Aug. 12, 1999

§ 102(e) Date: Aug. 12, 1999

(87) PCT Pub. No.: WO98/33581

PCT Pub. Date: Aug. 6, 1998

(30) Foreign Application Priority Data

Feb. 4, 1997 (DE) .............................................. 197 04 005

(51) Int. Cl.[7] .................................................. C12M 3/06
(52) U.S. Cl. ................ 435/297.4; 435/400; 210/321.64; 210/321.8; 210/321.81
(58) Field of Search .................................. 435/400, 401, 435/297.4; 472/48; 210/321.64, 321.8, 321.81, 321.89, 321.9

(56) References Cited

U.S. PATENT DOCUMENTS 3,612,282 * 10/1971 Cheng .
4,184,922 * 1/1980 Knazek et al. .
4,211,597 * 7/1980 Lipps et al. .

(List continued on next page.)

FOREIGN PATENT DOCUMENTS 2065918  10/1992 (CA) .
26 52 856 * 5/1978 (DE) .
28 06 237 * 8/1979 (DE) .

(List continued on next page.)

OTHER PUBLICATIONS

Majumder et al., "A New Liquid Membrane Technique for Gas Separation", AIChE Journal, Jul. 1988, vol. 34, No. 7, pp. 1135–1145.

Sengupta et al., "Separation of Solutes From Aqueous Solutions by Contained Liquid Membranes", AIChE Journal, Oct. 1988, vol. 34, No. 10, pp. 1698–1708.

Basu et al., "Pharmaceutical Product Recovery Using a Hollow Fiber Contained Liquid Membrane: A Cast Study", Journal of Membrane Science, 1992, vol. 75, pp. 131–149.

V. Gekas, "Terminology for Pressure–Driven Membrane Operations", Desalination, 1988, vol. 68, pp. 72–92.

*Primary Examiner*—William H. Beisner
(74) *Attorney, Agent, or Firm*—Oliff & Berridge, PLC

(57) ABSTRACT

Membrane module and process for its manufacture, wherein the membrane module contains at least two groups of hollow-fiber membranes, the groups arranged in layers and capable of being fed independently by fluids. The membrane module has a housing shell comprising a channel-shaped housing middle section, open at the top, and adjoining end pieces, also open at the top and with a number of arms corresponding to the number of groups. The groups of hollow-fiber membranes are inserted as layers over one another such that they are arranged in the direction of the longitudinal extent of the housing middle section and substantially parallel to each other. The ends of hollow-fiber membranes of different groups are arranged in respectively different arms of the end pieces and embedded with a sealing compound such that at least one end of the hollow-fiber membranes is open. The housing middle section and end pieces are closed with a covering device in a fluid-tight manner, thus forming a space enclosing the hollow-fiber membranes that can also accommodate a fluid stream.

40 Claims, 7 Drawing Sheets

U.S. PATENT DOCUMENTS

| | | | |
|---|---|---|---|
| 4,231,878 | * | 11/1980 | Esmond . |
| 4,911,846 | | 3/1990 | Akasu et al. . |
| 5,002,871 | * | 3/1991 | Iacobucci . |
| 5,043,260 | | 8/1991 | Jauregui . |
| 5,282,966 | * | 2/1994 | Walker . |
| 5,416,022 | | 5/1995 | Amiot . |
| 5,449,457 | * | 9/1995 | Prasad . |
| 5,712,154 | * | 1/1998 | Mullon et al. . |
| 5,955,353 | * | 9/1999 | Amiot . |
| 6,086,769 | * | 7/2000 | Kilambi et al. . |

FOREIGN PATENT DOCUMENTS

| | | | |
|---|---|---|---|
| 4005132 | | 8/1991 | (DE) . |
| 0 345 983 | * | 12/1989 | (EP) . |
| 0 514 021 A1 | | 11/1992 | (EP) . |
| 0 515 033 | | 11/1992 | (EP) . |
| 0 515 034 | * | 11/1992 | (EP) . |
| 0 531 631 | * | 3/1993 | (EP) . |
| 0 787 523 | | 8/1997 | (EP) . |
| 2014060 | | 8/1979 | (GB) . |

* cited by examiner

MODULE MADE OF AT LEAST TWO-TYPE HOLLOW FIBRES, AND PRODUCTION OF SAME

BACKGROUND OF THE INVENTION

1. Field of the Invention

The present invention relates to a process for manufacturing a membrane module containing at least two groups of hollow-fiber membranes arranged in layers and substantially parallel to each other, and a module of this type.

2. Discussion of the Related Art

In various processes in the pharmaceutical or chemical industries, it is necessary to conduct multi-stage extraction processes in which a component dissolved in an aqueous phase, for example, is first extracted using an organic phase and this component is subsequently separated from the organic phase using a second aqueous phase. Such multi-stage processes can be combined as single-stage processes in membrane modules containing two groups of hollow-fiber membranes, wherein the feed stream flows through the hollow-fiber membranes of one group and the strip stream ultimately containing the separated component flows through the hollow-fiber membranes of the second group. The space surrounding the hollow-fiber membranes is filled with the extraction fluid that transports the component to be extracted from the hollow-fiber membranes of the first group to the hollow-fiber membranes of the second group. The liquid enclosing the hollow-fiber membranes acts as a liquid membrane. Such processes are also described in the literature as CLM (contained liquid membrane) separation processes (see for example Majumdar et al., AIChE Journal, Vol. 34 (1988), No. 7, pp. 1135–1145; Sengupta et al., AIChE Journal, Vol. 34 (1988), No. 10, pp. 1698–1708; Basu et al., J. of Membrane Science, Vol. 75 (1992), pp. 131–149). Using these separation processes, components can be separated from both liquid or gaseous media. The membrane modules generally described in the cited literature have two groups of hollow-fiber membranes that in the middle section of the housing are arranged adjacently and parallel to each other. At the ends of the housing, the ends of the hollow-fiber membranes are separated by group, for example via Y-shaped end pieces with corresponding inlet or outlet arrangements.

Similar membrane modules having two groups of hollow-fiber membranes are also known from the field of biotechnology. In U.S. Pat. No. 5,043,260, a membrane module is described for breeding and preserving hepatocytes for an artificial liver, the module having in its middle section, which has a round cross-section, a bundle of two intermingled groups of hollow-fiber membranes arranged parallel to one another. The ends of the hollow-fiber membranes are separated by group and embedded into Y-shaped end pieces at the ends of the module housing. The hepatocytes are immobilized on the external surfaces of the hollow-fiber membranes; nutrient liquid is fed in via the hollow-fiber membranes of the first group and waste products are removed via the hollow-fiber membranes of the second group.

EP-A-514-021 discloses membrane modules that are suitable for CLM separation processes, as well as a process for manufacturing the modules. Initially, for example, a single hollow-fiber membrane is laid on wave-shaped and intersecting paths in multiple layers on a suitable frame, and in this manner a bundle is produced. In a further step, the loops producing during the laying process are cut through at the ends of the bundle and the end pieces produced following cutting are separately combined. In this manner, two groups of intermingled hollow-fiber membranes are produced in the bundle; when the bundle is removed from the frame, the hollow-fiber membranes in the bundle have a sinusoidal, in part intersecting arrangement.

The bundles obtained hereby are drawn into tube-shaped housing middle sections and the end pieces are directed separately into the arms of Y-shaped end pieces, into which they are embedded. The arms of the Y-shaped end pieces are joined to appropriate inlet and outlet arrangements such that two different liquids can flow separately through the two groups of hollow-fiber membranes.

These membrane modules according to EP-A-514 021 exhibit the disadvantage that the hollow-fiber membranes of the two groups have varying spacing from each other over the entire extent of the housing, and zones may result with different filling ratios of the hollow-fiber membranes. Furthermore, drawing of the bundles into the housing components proves problematic, especially when the housings are relatively long and especially when higher overall filling ratios of the hollow-fiber membranes in the housing are to be attained. Finally, while a membrane module according to EP-A-514 021 does contain two groups of hollow-fiber membranes capable of being fed independently by fluids, the hollow-fiber membranes of the two groups must always be the same due to the manufacturing process of the module.

A concept similar to that of EP-A-514 021 is pursued in EP-A-515 034. The modules according to EP-A-515 034 also contain hollow-fiber membrane arrangements with which two groups of hollow-fiber membranes are associated, wherein their ends, separated by group, are directed through the arms of Y-shaped end pieces. These arrangements are constructed of superimposed layers made from pieces of hollow-fiber membrane fabrics of appropriate width and length, and the hollow-fiber membranes in the fabrics run in the warp direction. In the fabrics, the hollow-fiber membranes are spaced from each other in a parallel arrangement by monofilament weft threads, for example.

These arrangements of superimposed hollow-fiber membrane layers are initially produced on appropriate apparatus by stacking layers of the two groups of hollow-fiber membranes over one another in an alternating fashion. In the middle section, the hollow-fiber membranes of the two groups are parallel to each other, and the end regions of the layers are diverted in an alternating manner, separated by group, to the sides in a Y shape. After separately combining the respective end regions, such as with adhesive tape, the finished stack is drawn into the tube-shaped middle section of a housing and the end regions are introduced into the arms of Y-shaped end pieces and embedded therein.

Although the membrane modules according to EP-A-515-034, in comparison to those according to EP-A-514 021, have a higher order and more uniform spacing of the hollow-fiber membranes of the first group from those of the second group, the production of these membrane modules is complicated by the separate production of the hollow-fiber membrane stacks, and the handling of stacks with relatively large cross-section is difficult. Furthermore, drawing the stacks into the housing is problematic, especially in the case of relatively long housings, and the danger exists in this case that the previously realized high order of the hollow-fiber membranes is nullified. Moreover, due to the production technique, there are restrictions with respect to filling ratio. Because of the restrictions with respect to the size of the stack cross-sections and the housing lengths, the module and production concept described for EP-A-515 034 ultimately permits only membrane modules with comparatively small membrane exchange surfaces. Furthermore, the manufacturing complexity of the membrane modules according to EP-A-515 034 increases rapidly if, for example, the system is to be expanded to more than two groups of hollow-fiber membranes or special arrangements of the group of hollow-fiber membranes are needed, and special demands are placed on directing the flow through the hollow-fiber membranes of the individual groups.

This also applies to the membrane modules according to EP-A-515 033, which differ from those of EP-A-515 034 in that the membrane stacks consist of at least one pair of superimposed fabric strips made from hollow-fiber membranes, where the fabric strips are folded with each other parallel to the hollow-fiber membranes in a zigzag pattern and superimposed to form a stack.

SUMMARY OF THE INVENTION

The present invention thus has the object of providing a process with which membrane modules of the type initially cited, with a wide range of embodiments, can be manufactured simply and economically, wherein membrane modules with relatively large exchange surfaces can be manufactured, and the use of which permits, in the membrane modules so produced, a high order of the hollow-fiber membranes and also the realization of high filling ratios of the hollow-fiber membranes in the module housing.

The present invention further has the object of providing membrane modules of the initially cited type, in which a high order of the hollow-fiber membranes and also high filling ratios of the hollow-fiber membranes can be realized in the module housing, which enable, for example, a controlled flow between the hollow-fiber membranes of the individual groups, are simple to manufacture, and have a wide range with respect to the membrane exchange surface and the type of embodiment, so that they can be employed in a large number of different applications.

The object is achieved on the one hand by a process for manufacturing a membrane module with a housing middle section, containing at least two groups of hollow-fiber membranes, the groups arranged in layers and capable of being fed independently by fluids, wherein the hollow-fiber membranes within one group and the hollow-fiber membranes of different groups, at least in the housing middle section, are arranged substantially parallel to each other and each layer contains only hollow-fiber membranes of a single group, the process comprising at least the following steps:

a) selecting a channel-shaped housing middle section that is open at the top and the ends of which terminate in end pieces, also open at the top and each with a number of arms corresponding to the number of groups of hollow-fiber membranes, where the housing middle section and the end pieces together form a housing shell, b) inserting the at least two groups of hollow-fiber membranes into the housing middle section and the end pieces, in each case in the form of layers superimposed such that the hollow-fiber membranes lie substantially in the direction of the longitudinal extent of the housing middle section and substantially parallel to each other, and terminate in the arms of the end pieces, whereby the ends of different groups of hollow-fiber membranes are arranged in respective different arms of the respective end pieces, c) closing the housing middle section and the end pieces with a covering device, d) embedding the ends of the hollow-fiber membranes at least in the arms of the end pieces with a sealing compound in such a manner that the hollow-fiber membranes penetrate the sealing compound with at least one of their ends and are open at this end and that a space enclosing the hollow-fiber membranes is formed between the hollow-fiber membranes, the inner wall of the housing middle section, the inside of the covering device facing the housing middle section, and the sealing compounds.

The object is further achieved by a membrane module with a module housing, comprising a housing middle section with a longitudinal extent, terminating at its ends in end pieces each with at least two arms, wherein the module housing contains at least two groups of hollow-fiber membranes, capable of being fed independently by fluids and arranged in layers such that each layer contains only hollow-fiber membranes of a single group, the hollow-fiber membranes being arranged substantially in the direction of the longitudinal extent of the housing middle section and substantially parallel to each other, and the ends of the hollow-fiber membranes terminating in the arms of the end pieces, wherein the ends of the groups of hollow-fiber membranes are each arranged separately in different arms of the end pieces and the hollow-fiber membranes, at least in the arms of the end pieces, are embedded with a sealing compound such that at least one of the ends of the hollow-fiber membranes penetrate the sealing compound and are open at this end, and wherein the open ends of the hollow-fiber membranes, separated by group, are each in communication with an inlet arrangement or an outlet arrangement, wherein the housing middle section and the end pieces, and their arms, are shaped as channels open at the top and together constitute a housing shell, and that the tops of the housing middle section and of the end pieces are sealed with a covering device in a fluid-tight manner and a space is thereby formed enclosing the hollow-fiber membranes between the hollow-fiber membranes, the inner wall of the housing middle section, the inside of the covering device facing the housing middle section, and the sealing compound

DETAILED DESCRIPTION OF PREFERRED EMBODIMENTS

Figure 1:
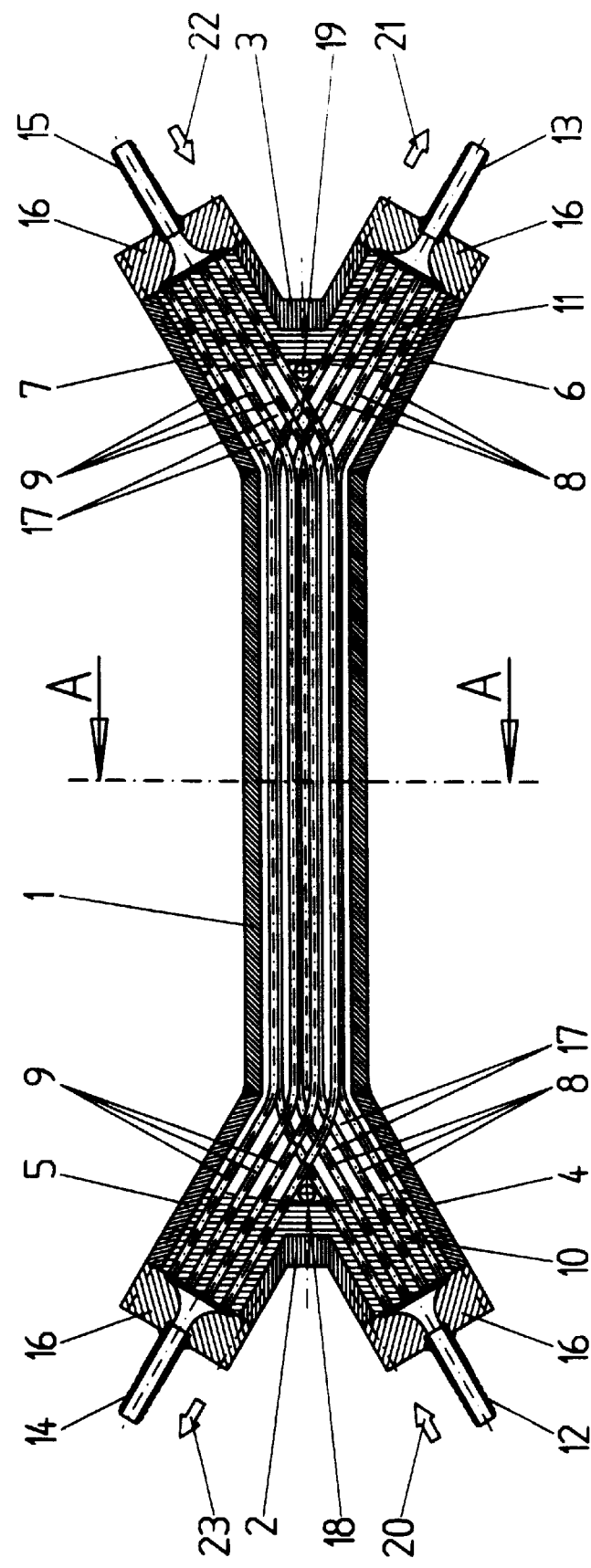
FIG. 1: shows a longitudinal section through a membrane module according to the invention, with two groups of hollow-fiber membranes.

The use according to the invention of a channel-shaped housing middle section, open at the top and connected to channel-shaped end pieces that are also open at the top, enables ready insertion of the layers of the hollow-fiber membranes into the housing middle section and laying of the ends of the hollow-fiber membranes, separated by layer, into the arms of the ends pieces from above. At the same time, to adapt to the intended application, a wide variety of embodiments of the module according to the invention can be manufactured or provided in a simple manner, such as adjusting the number of layers, the hollow-fiber membranes used in the layers, the number of groups of hollow-fiber membranes, or the ability of the various hollow-fiber membranes to accommodate flow, as will be explained in the following.

After filling with the layers of the groups of hollow-fiber membranes, the housing middle section and the adjoining end pieces, i.e., the housing shell, can be sealed at the top in a fluid-tight manner using a covering device. The covering device can consist of one or more pieces and be permanently joined to the housing middle section and the end pieces in the form of a cover, for example, such as by welding or adhesive means. Preferably, this covering device is designed to be removable, for example attached by screws to the housing middle section and the end pieces and fitted with a seal. Advantageously, it is designed to be transparent or has a viewing window for observing any changes occurring in the interior of the module, particularly leaks in the hollow-fiber membranes.

In a further advantageous embodiment of the module according to the invention, the covering device is likewise shaped as a housing shell, i.e., likewise a channel-shaped middle section, open at the top, with adjoining channel-shaped end pieces open at the top, whereby this second housing shell is preferably identically symmetrical in reflection to the first, lower housing shell. In this case, as for the lower housing shell, the at least two groups of hollow-fiber membranes capable of being fed independently by fluids are also each inserted in layers into the upper, second housing shell, i.e., the covering device, so that after joining the two housing shells the inner cross-section of the middle section of the housing is completely and uniformly filled with hollow-fiber membranes.

Preferably, housing middle sections have a rectangular or square inner cross section. In the case of such cross-sections of the housing middle section, adjustment of the layer width to the width of the cross-sections is unnecessary, since the width of the layers is uniform over the height of the housing, and at the same time a high packing density or high filling ratio of the hollow-fiber membranes in the housing can be achieved. It is of special advantage in this case if the end pieces have a rectangular or square cross-section at least in certain areas. In this way, a particularly simple manufacturing process can be realized for manufacturing the membrane modules according to the invention, for example, permitting economical manufacture of such membrane modules with simple handling. At the same time, membrane modules so designed and produced can have an identical geometrical shape of adjacent layers of hollow-fiber membranes over the entire height of the housing. This can be of advantage, particularly, for example, for those applications in which a uniform and defined flow is required between adjacent layers.

In a further advantageous embodiment of the process or membrane module according to the invention, the housing middle section has a sector-shaped inner cross-section. Such shapes of the housing middle section can be easily manufactured from tube-shaped precursors, whereby each of the end pieces likewise has a round or sector-shaped inner cross-section. The connections such as the inlet and outlet arrangements can be screwable. In the case of housing middle sections with sector-shaped inner cross-section, those with semicircular inner cross-section are preferred, whereby the covering device in this case also is designed as a housing shell, identically symmetrical in reflection, whose middle part has a semicircular inner cross-section. In this manner, a membrane module housing is obtained that consists of two half-shells, at least in the region of the housing middle section, where it has a semicircular cross-section. Such housing shapes are preferably used when the application requires the inner cross-section in the region of the housing middle section to be rotationally symmetrical about the axis in the longitudinal extent of the housing middle section, or the inner cross-section to have no corners that could lead to dead space.

Of course, further embodiments of the inner cross-section of the housing middle section are possible, such as a stepped embodiment in which the width of the steps increases over the height of the housing. The step height is preferably selected such that it corresponds to a packing height of 3 to 6 layers of hollow-fiber membranes. In this manner, only a stepwise and not a continuous adjustment of the layer width to the housing width is necessary. The outside contour of such step-shaped inner cross-sections can then be circular, however.

The embedding of the ends of the hollow-fiber membranes with a sealing compound can take place before or after positioning the covering device. It is practical, however, to perform the embedding after the end pieces in particular have been closed with a covering device, since this ensures a clean termination of the sealing compound at the top as well. In this case, it is sufficient, for various applications of the membrane module according to the invention, if the ends of the hollow-fiber membranes are embedded only in the region of the arms or even in only a portion of these arms. In these cases, the space enclosing the hollow-fiber membranes is delimited by the inner wall of the housing middle section and possibly the remaining part of the end pieces, the inside of the covering device, and the sealing compounds.

In other cases, however, such as when the application requires that the hollow-fiber membranes have a high order in the unembedded portion, such as a high degree of parallelism and a defined uniform spacing from each other, it may also be necessary to embed the hollow-fiber membranes in the end areas of the housing middle section. In these cases, the space enclosing the hollow-fiber membranes is delimited by the remaining portion of the inner wall of the housing middle section and the covering device and by the sealing compounds.

In embodiments in which the housing is composed of top and bottom shells and the groups of hollow-fiber membranes are laid into both shells, it can be practical, prior to joining the shells, to embed the hollow-fiber ends separately in sealing compound in the individual shells.

According to the invention, the ends of the hollow-fiber membranes, separated by group, are embedded in a sealing compound such that at least one of their ends penetrates the sealing compound and is open at this end. In a preferred embodiment of the process or membrane module according to the invention, the hollow-fiber membranes are or have been embedded in the sealing compound such that each of their two ends penetrates the sealing compound and is open, whereby in each case one open end of the hollow-fiber membranes of the at least two groups, separated by group, is in communication with an inlet arrangement and the other open end is in communication with an outlet arrangement. The flow through such arrangements of hollow-fiber membranes then normally occurs in cross-flow mode.

In a further preferred embodiment of the invention, the hollow-fiber membranes of at least one group are closed at one end, while the other end is open. These hollow-fiber membranes are driven in dead-end mode and can then, of course, be fed only from one end, the open end. In this case, a fluid can be introduced via these hollow-fiber membranes, open at one end, in dead-end mode into the space enclosing the hollow-fiber membranes, or a fluid can be extracted from the enclosing space via these hollow-fiber membranes. For the definitions of the terms dead-end mode and cross-flow mode, reference is made to the publication by V. Gekas: "Terminology for pressure-driven membrane operations", Desalination Vol. 68 (1988), 72–92.

Groups of hollow-fiber membranes open at only one end can be produced, for example, by laying the hollow-fiber membranes in the housing shell and embedding them in the sealing compound such that the subsequently closed end does not penetrate the sealing compound and the still-fluid sealing compound thus enters and seals off these hollow-fiber membrane ends. In an embodiment of the membrane module according to the invention, with three groups of hollow-fiber membranes, for example, the hollow-fiber membranes of two groups can be closed at one end and those of the third group open at both ends, so that in application two groups of hollow-fiber membranes are driven in dead-end mode and one group of hollow-fiber membranes in cross-flow mode. An application example of such a module is the breeding of cell cultures wherein the introduction of nutrients can take place via one membrane group driven in dead-end mode and removal of waste products or certain active substances via the second, and the cells can be supplied with oxygen via the membrane group driven in cross-flow mode using an appropriately selected oxygenation membrane.

The individual groups of hollow-fiber membranes can each consist of subgroups of hollow-fiber membranes with different functions. In a preferred embodiment of the membrane module according to the invention, at least one group of hollow-fiber membranes consists of at least two subgroups of hollow-fiber membranes arranged in layers, whereby in an especially preferred embodiment of the invention only hollow-fiber membranes of a single subgroup are contained in each respective layer and the hollow-fiber membranes of this at least one group are embedded such that they are open only at one end and the end pieces in which the open ends of hollow-fiber membranes of different subgroups are embedded are located at opposite ends of the housing middle section.

Because the housing shell is open at the top, this can be realized in a particular simple manner in the membrane module or process according to the invention by inserting the hollow-fiber membranes of the subgroups into the housing shell in layers somewhat offset with respect to their longitudinal extent. Prior to embedding, the ultimately closed hollow-fiber ends are initially open and the ultimately open ends are closed by heat sealing, for example, and extend somewhat beyond the ultimately closed ends. Embedding then takes place such that, at the start of the embedding procedure, each of the two hollow-fiber ends lies in the sealing compound, whereby during embedding the still-fluid sealing compound penetrates into the ultimately closed ends and seals them. When the sealing compound has hardened, each sealing compound, together with the hollow-fiber ends, is cut perpendicularly to the hollow-fiber ends such that the ultimately closed ends are positioned in the sealing compound and remain closed, while the ultimately open ends penetrate the sealing compound and are opened as a result of cutting. The open ends of the hollow-fiber membranes are then joined to inlet and outlet arrangements, respectively.

Of course, other combinations of groups or subgroups of hollow-fiber membranes driven in dead-end and cross-flow mode are possible.

Because the covering device is designed to be removable, it is also readily possible at the same time to replace the hollow-fiber membranes in the housing, such as when defects in the hollow-fiber membranes have been noted or their service life has been attained. In this manner, the housing, with the middle section, end pieces, and covering device, can be used multiple times. For this reason, the invention also comprises a process for replacing the hollow-fiber membranes in a membrane module containing at least two groups of hollow-fiber membranes, the groups arranged in layers and capable of being fed independently by fluids, in which module the hollow-fiber membranes within one group as well as the hollow-fiber membranes of different groups are arranged substantially parallel to each other and each layer contains only hollow-fiber membranes of a single group, the process characterized by at least the steps that a) a housing with removable covering device is selected when the module is manufactured, b) the covering device is removed prior to the replacement, c) the hollow-fiber membranes contained in the housing, together with the embedded portions at the ends of the hollow-fiber membranes, are removed from the housing, and d) the process for manufacturing a membrane module according to the present invention is conducted to reassemble the membrane module.

Preferably, the membrane module according to the invention contains two groups of hollow-fiber membranes. In this case, the end pieces each have two arms, so that a Y-shape of the end pieces results, for example. Generally, i.e., also when the membrane module according to the invention contains more than two groups of hollow-fiber membranes, the arms of the end pieces can be arranged in different ways. In an advantageous embodiment, the arms of the end pieces form an angle of 0° with respect to the longitudinal axis of the housing middle section, yielding the advantage that, after embedding the hollow-fiber membranes in sealing compound, a common end cut can take place and common end caps with different chambers can be used for the inlet and outlet arrangements. The end pieces in this case can also, for example, represent an extension of the housing middle section and, including their arms, have the same external shape as the housing middle section, whereby separation walls are inserted at the end of the end pieces in the direction of the longitudinal extent of the housing middle section, the walls providing a separation of the hollow-fiber membranes according to group. Other constructions of the end pieces and different cross-sections of the arms are possible, however, depending, for example, on whether a constant filling ratio in the housing middle section and end pieces, a constant spacing between the hollow-fiber membranes within one layer or the like is desired, or whether requirements for designing the end pieces are imposed by the application.

In case the membrane module contains more than two groups of hollow-fiber membranes, the number of arms of the end pieces corresponds to the number of groups, and the arms for practical reasons diverge at different angles.

The groups of hollow-fiber membranes can be inserted into the housing middle section and the arms of the end pieces as individual capillaries, such as by automatic winding or laying apparatus, such that the longitudinal axis of the hollow-fiber membranes lies in the direction of the longitudinal axis of the housing middle section. Preferably, however, the hollow-fiber membranes of the individual groups are incorporated into respective hollow-fiber mats prior to insertion into the housing, which greatly facilitates handling.

The hollow-fiber membranes can be incorporated into the hollow-fiber mats using flat, preferably strip-shaped connection elements, for example, which preferably are uniformly spaced from one another. Such strip-shaped connection elements can run perpendicular, but also at another angle, to the hollow-fiber membranes that are substantially parallel to each other and can, for example, be laminated thereon using an adhesive, such as on polyurethane basis, applied pointwise.

Preferably, however, the hollow-fiber membranes are incorporated into the hollow-fiber mats using transverse threads, such as in the form of textile threads. Using known methods, such mats can be advantageously produced as knitted mats, woven mats, or small woven ribbons, or also as crocheted mats. In the case of weaving or knitting, the transverse threads are the woven or warp threads running transversely to the hollow-fiber membranes. These transverse threads hold the hollow-fiber membranes in a stable arrangement in which they are spaced from and substantially parallel to one another, which permits a high order of the hollow-fiber membranes in the module.

For various applications, however, hollow-fiber mats or mat-shaped elements of hollow-fiber membranes can be used, such as can be produced using the process described in DE-OS-40 05 132. According to this specification, such mat-shaped elements can be produced by winding hollow-fiber membranes in multiple layers onto a rotating drum, wherein the hollow-fiber membranes are traversed by suitable thread-guiding elements such that the hollow-fiber membranes within one winding layer are arranged substantially parallel to each other and the hollow-fiber membranes of adjacent winding layers are arranged in a crossed fashion. Following the winding procedure, the winding consisting of the winding layers is divided on the circumference of the winding drum by welding, for example, perpendicular to the circumferential direction in segments of equal length. The welding connects the ends of the hollow-fiber membranes in these segments, resulting in the formation of mat-shaped elements of hollow-fiber membranes.

Such elements can be used in the framework of the present invention if on the one hand the number of winding layers is small and in the range less than about 10. On the other hand, it is necessary for the reversal angle of the hollow-fiber membranes produced by traversing during winding onto the drum to be adjusted such that the hollow-fiber membranes of adjacent winding layers cross at a small angle, understood to be an angle $\leq 15°$. With such an angle of intersection, the hollow-fiber membranes at the same time form an angle $<10°$ with respect to the circumferential direction of the drum. This is at the same time the angle formed by the hollow-fiber membranes with respect to the longitudinal extent of the housing middle section, if the aforementioned mat-shaped hollow-fiber membrane elements are inserted as layers into the housing middle section and the end pieces when manufacturing the membrane module according to the invention. In the framework of the present invention, therefore, hollow-fiber membranes that extend at an angle of at most 15° to each other and to the longitudinal extent of the housing middle section are considered to be substantially parallel to each other and to the longitudinal extent of the housing middle section.

According to a preferred embodiment of the process or the module according to the invention, the hollow-fiber mats comprising respective groups of hollow-fiber membranes are or have been stacked as layers. In this case, different sequences of layers of the various groups of hollow-fiber membranes can be implemented, so that, for example, the hollow-fiber membranes of one group in the stack are present in greater portion than the hollow-fiber membranes of the remaining groups. In a preferred embodiment, the layers of hollow-fiber membranes are arranged such that an alternating sequence of the layers of the different groups of hollow-fiber membranes results. This also applies to the case in which the hollow-fiber membranes are introduced into the housing as individual capillaries, i.e., not in the form of mats.

In case at least one group of hollow-fiber membranes consists of at least two hollow-fiber membrane subgroups arranged in layers, the individual layers of the subgroups are preferably included in the alternating sequence. In a membrane module containing two groups of hollow-fiber membranes, where each group consists of two subgroups, there can, for example, be an alternating sequence of hollow-fiber membranes of the first subgroup of the first group, hollow-fiber membranes of the first subgroup of the second group, hollow-fiber membranes of the second subgroup of the first group, and hollow-fiber membranes of the second subgroup of the second group.

According to a further preferred embodiment of the process or module according to the invention, at least one arrangement of superimposed hollow-fiber mats, with one hollow-fiber mat of each group of hollow-fiber membranes, is folded in a zigzag pattern, parallel to the hollow-fiber membranes, to form a stack, with a spacing corresponding to the width of the housing middle section, and the stack thus formed is inserted into the housing middle section, whereby the ends of the hollow-fiber membranes of different groups are introduced into different arms of the respective end pieces, after the ends of the hollow-fiber mats have been separated by group. To facilitate the separation, the ends of the hollow-fiber mats can be taped prior to stacking, using appropriate separation strips, for example. In such a construction of the stack, the individual layers contain hollow-fiber membranes of a single group. Only at their edges can they also exhibit hollow-fiber membranes of the other group or groups, due to being folded together with mats containing hollow-fiber membranes of another group. In the context of the present invention, however, the layers so constructed are also considered to be layers containing only hollow-fiber membranes of a single group.

Depending on the desired use of the membrane module according to the invention, it is advantageous if there is a defined spacing between adjacent layers of the hollow-fiber membranes. This is of importance, for example, if, as previously discussed, when carrying out a process with CLM technique a liquid is required in the space enclosing the hollow-fiber membranes that acts as a liquid membrane and for practical reasons has a defined thickness that is as uniform as possible in order to make residence times uniform for the transport of a substance to be separated. To adjust the spacing between the individual hollow-fiber membrane layers, a spacer can be introduced between the layers, such as in the form of a fluid-permeable nonwoven. A spacing function is assumed when using hollow-fiber mats, already by the transverse threads or strip-shaped connecting elements. This permits relatively small spacing between the individual layers and keeps the filling ratios in the housing at a high level.

Furthermore, with the process or membrane module according to the invention, it is also readily possible to insert carrier materials provided with certain functions into the space enclosing the hollow-fiber membranes. Particle-shaped carrier materials such as activated charcoal can be introduced to remove by adsorption certain substances from the fluid passing through the module. Layered carrier materials can also be introduced, such as in the form of flat membranes or nonwovens, that have been provided with functional groups, in order to selectively separate substances from the fluid in transit, such as by affinity chromatography. For example, cells can be enclosed or immobilized in the enclosing space, where supply of nutrient liquid and oxygen and removal of waste products take place via the hollow-fiber membranes, so that the membrane modules according to the invention are excellently suited for applications in the medical technology field. For example, whole blood can be introduced into the enclosing space, or hepatocytes can be present in the enclosing space, such as when using membrane modules according to the invention as an artificial liver.

Hollow-fiber membranes with differing outer contours, i.e., differing outlines when viewed in cross-section, can be used. The hollow-fiber membranes can, for example, have a contour that is essentially round or circular, triangular, rectangular, hexagonal, or octagonal. They can also be oval, elliptical, or with three or four lobes, etc. To realize high filling ratios, hollow-fiber membranes are preferred with contours that are approximately triangular, rectangular, square, or hexagonal. The filling ratio in this case refers to the volume of the hollow-fiber membranes that is defined by the outer contour. High filling ratios can also be achieved by a suitable deformation of the hollow-fiber membranes used. For example, hollow-fiber membranes with a round contour can be converted to an approximately rectangular shape, which facilitates higher filling ratios if a hollow-fiber mat with round hollow fibers is calendered.

For use in the membrane module according to the invention, hollow-fiber membranes have proven satisfactory that have a wall thickness between 5 $\mu$m and 900 $\mu$m, and hollow-fiber membranes with a wall thickness between 30 $\mu$m and 200 $\mu$m have proven especially satisfactory. Preferably, the hydraulic diameter of the lumen of the hollow-fiber membranes employed is 50 $\mu$m to 1500 $\mu$m, and hollow-fiber membranes with a hydraulic diameter of the lumen between 100 $\mu$m and 500 $\mu$m are especially preferred. The hydraulic diameter is defined as 4×A/C, where A is the area of the flow cross-section of the hollow-fiber lumen and C is the circumference of the flow cross-section of the respective hollow-fiber lumen.

Depending on the structure of the stack, the geometric structure of the hollow-fiber membranes of the individual groups can be the same or different. It is practical in many cases, for example in a stack structure comprising an alternating sequence of the layers of different groups of hollow-fiber membranes, to design the hollow-fiber membranes of the individual groups identically. On the other hand, for a stack structure in which the number of layers of one group of hollow-fiber membranes exceeds that of the other groups, it can be advantageous for the hydraulic diameter of the hollow-fiber membranes contained in the type of layer with lower representation to be larger. Correspondingly, there can also be differences between the hollow-fiber membranes of individual subgroups of a group of hollow-fiber membranes.

The requirements placed on the construction of the hollow-fiber membranes or their structure result from the respective application of the membrane module. The hollow-fiber membranes can be non-porous or porous, whereby in the latter case, depending on whether the application is one of nanofiltration, ultrafiltration, or microfiltration, the membranes can have mean pore sizes from a few Å up to those in the range of several $\mu$m. The membrane structure, i.e., the pore-size distribution across the thickness, can be isotropic, i.e., the pore diameters are substantially constant within the membrane structure, or it can be anisotropic, symmetrical, or asymmetrical, and multilayer membranes can also be used. In individual cases, hollow-fiber membranes can be used that have a non-porous, fluid-tight wall and perform heat-exchange rather than substance exchange functions when using the module according to the invention.

Depending on the desired application of the membrane module according to the invention, the hollow-fiber membranes of the various groups can be the same or different. In addition to the diameter, which was previously discussed, differences can exist with respect to their pore structure or pore diameter, for example. The same also applies with respect to the hollow-fiber membranes of individual subgroups of a group of hollow-fiber membranes.

There are no restrictions whatsoever with respect to the material from which the hollow-fiber membranes are made. Membranes can be used that are made from inorganic materials such as glass, ceramics, $SiO_2$, carbon, or metal, or from organic polymers or blends thereof. The polymers can be hydrophilic and/or hydrophobic in nature. They can be selected from the group of cellulosic polymers such as cellulose or regenerated cellulose, modified cellulose such as cellulose esters, cellulose ethers, amine-modified celluloses, or blends of cellulosic polymers, from the group of synthetic polymers such as polyacrylonitrile and corresponding copolymers, polymers containing polyurethane, polyarylsulfones and polyarylethersulfones such as polysulfone or polyethersulfone, polyvinylidene fluoride, polytetrafluoroethylene, water-insoluble polyvinyl alcohols, aliphatic and aromatic polyamides, polyimides, polyetherimides, polyesters, polycarbonates, polyolefins such as polyethylene, polypropylene, polyvinyl chloride, polyphenylene oxide, polybenzimidazoles and polybenzimidazolones, as well as from modifications, blends, mixtures, or copolymers derived from these polymers. Other polymers, for example polyethylene oxide, polyhydroxyether, polyethylene glycol, polyvinylpyrrolidone, polyvinyl alcohol, or polycaprolactone, or inorganic substances such as $SiO_2$, can be mixed as additives with these polymers or polymer blends. In individual cases, the membrane can also have been subjected to a surface modification, for example, in order to establish certain properties of the membrane surface, such as in the form of certain functional groups. They can also have certain substance-specific groups, such as in the form of ligands for affinity separation processes, enzymes, or catalysts, which are immobilized on and/or in the membranes, i.e., on their external and/or internal surfaces formed by the pores, or viruses or cells can be bound to the membranes.

The materials comprising the hollow-fiber membranes of the individual groups, or the individual subgroups if any, can be the same or different. It is preferred to use a uniform material for the membranes.

There are no limitations whatsoever with respect to the geometric dimensions of the membrane modules produced by the process according to the invention. Membrane modules can readily be produced with lengths of the housing middle section between 20 mm and 2 m, as well as housing widths and heights between 5 and 200 mm. In particular, metals or polymer materials have proven satisfactory as the materials for the housing, in particular for the housing middle section, the end pieces, and the covering device. The housing middle section and the end pieces can each be composed of multiple pieces, but they can also be fashioned from one piece. Pieces formed by injection molding, for example, can readily be used.

At the free ends of the arms of the end pieces, the modules have inlet and outlet arrangements that are in communication with the open ends of the hollow-fiber membranes embedded in the arms. If they are open at both ends, this results in the hollow-fiber membranes of each group being in communication with an inlet and an outlet arrangement, and separate fluids can be directed to each group. During operation, for example with a membrane module containing two groups of hollow-fiber membranes, a first fluid flows via a first inlet arrangement into and through the lumen of the first group of hollow-fiber membranes, and leaves the housing via a first outlet arrangement in communication with these hollow-fiber membranes. Likewise, a second fluid flows via the second inlet arrangement into and through the lumen of the second group of hollow-fiber membranes and leaves the housing via the second outlet arrangement. Depending on the application, the fluids can be directed through the housing in the same or opposite directions, whereby in one case the inlet arrangements, for example, are located at the same end of the housing, while in the second case they are located at opposite ends. In cases in which hollow-fiber membranes of a group or subgroup are open only at one of their ends and are then driven in dead-end mode, the open ends are in communication with an inlet arrangement or an outlet arrangement.

With various applications, it can be important for the fluid in the space enclosing the hollow-fiber membranes to be stationary, i.e., to stagnate and in particular not be subjected to convective flow. Such undesirable flow properties can occur with CLM processes, for example. In a membrane module with two groups of hollow-fiber membranes, in which a liquid contained in the enclosing space serves as a liquid membrane and carrier for a component to be separated, concentration differences can arise in the liquid in the enclosing space and lead to differences in fluid-density and thus to undesirable circulation currents along the longitudinal extent of the module.

In a preferred embodiment, therefore, in the space enclosing the hollow-fiber membranes along the longitudinal extent of the housing middle section, the membrane module according to the invention has at least one separation device substantially perpendicular to this longitudinal extent. According to an especially preferred embodiment, the at least one separation device divides the enclosing space into chambers that are separated from each other in an at least substantially fluid-tight manner.

In other applications, in which a fluid flows through the enclosing space, it can be advantageous, for increasing the mass transfer on the outside of the hollow-fiber membranes, to induce a flow of the fluid in the enclosing space transversely to the hollow-fiber membranes, for example by diversion elements. This can be achieved by separation devices in the enclosing space that extend over only a portion of the cross-section of the housing middle section, for example over the full height but only a portion of the width of the housing middle section. According to a likewise especially preferred embodiment of the module according to the invention, the at least one separation device extends over a portion of the cross-section of the housing middle section.

Such separation devices can be readily introduced into the enclosing space during manufacture of the membrane modules according to the invention when laying the hollow-fiber membrane layers, by applying strips, using for example, strips of special epoxy resins, polyurethane resins, or hot-melt adhesive, that are substantially perpendicular to the longitudinal extent of the housing middle section, over each respective layer of hollow-fiber membranes positioned in the housing middle section, the strips preferably at the same time enclosing the hollow-fiber membranes of the respective layer. In the preferred case in which the enclosing space is to be divided into chambers that are separated from each other in an at least substantially fluid-tight manner, this procedure is repeated after each layer and strips are applied at the same location in each case along the housing middle section. In the also preferred case that the separation walls serve as diversion elements for the flow in the space enclosing the hollow-fiber membranes, the strips can also extend, for example, over only a portion of the width of the housing middle section or the housing height, and be positioned at various locations along the longitudinal extent of the housing middle section.

In individual cases, it can also be sufficient to construct such separation devices using suitable spacers introduced between the individual layers of hollow-fiber membranes. Another possibility when using hollow-fiber mats is to position the transverse threads or strip-shaped connecting elements, by which the hollow-fiber membranes are incorporated into the hollow-fiber mats, in the stack such that these transverse threads or connecting elements are directly superimposed in the layer stack and thus ensure at least in part a seal of the space enclosing the hollow-fiber membranes.

In a further advantageous embodiment, the module according to the invention has at least one separation device that divides the enclosing space into separate chambers but has fluid-permeable elements, via which the chambers adjacent to the separation device are in fluid communication with each other and which permit a controlled flow between the adjacent chambers. Such selectively permeable separation devices can be obtained, for example, by inserting individual capillary tubes with small flow cross-sections into otherwise fluid-impermeable separation devices. Such separation devices enable, for example, the filling of the entire enclosing space with a liquid, without having to provide each chamber with separate inlet and outlet arrangements. If circulation currents in the enclosing space are to be avoided at the same time, for example, the permeability of the separation devices must, of course, be correspondingly low.

At least to enable filling, the space enclosing the hollow fibers is provided with an inlet arrangement. In other cases, the space has an inlet and an outlet arrangement, so that a fluid can flow through the enclosing space or ventilation can take place when filling the space with a liquid. In case the enclosing space is divided using the described separation devices into chambers that are separated in a substantially fluid-tight manner, at least one of these chambers has at least an inlet arrangement.

Sensors of various types can also be introduced in the space enclosing the hollow-fiber membranes, for space reasons preferably in the region of the end pieces. These sensors permit monitoring of the physico-chemical conditions in the enclosing space while the membrane modules according to the invention are being used. For example, using a suitable sensor, changes in conductivity or pH can indicate a faulty seal of the hollow-fiber membranes if liquids in the hollow-fiber membranes and those in the enclosing space differ with respect to these properties.

In the following, the invention will be described in more detail on the basis of the drawings, in simplified schematic representation:

FIG. 1 shows a schematic representation of a longitudinal section through a membrane module according to the invention, whose housing has a middle section 1 with rectangular cross-section that is open at the top and the ends of which terminate in Y-shaped end pieces 2, 3, each open at the top and each with two arms 4, 5 and 6, 7, in this example with rectangular cross-section. In the housing middle section, two groups of hollow-fiber membranes 8, 9 are arranged in superimposed layers such that the hollow-fiber membranes are parallel to each other and to the longitudinal extent of the housing middle section 1. For clarity, only four capillaries per layer are shown.

In the vicinity of the ends, the hollow-fiber membranes 8, 9, separated by group, have been introduced into the arms of the end pieces and embedded using sealing compound 10, 11 such that they penetrate the sealing compound 10, 11 and are open at their ends. The ends of hollow-fiber membranes 8 of the first group are positioned within arms 4 and 6 and those of hollow-fiber membranes 9 of the second group within arms 5 and 7. Of course, other arrangements are conceivable, for example, that hollow-fiber membranes 8 of the first group are inserted into arms 4 and 7 and those of the second group into arms 5 and 6.

The lumina of the hollow-fiber membranes 8 of the first group are in communication with the inlet arrangement 12 and the outlet arrangement 13, and the lumina of the hollow-fiber membranes 9 of the second group with the inlet arrangement and the outlet arrangement 14, whereby the inlet and outlet arrangements are secured to the ends of arms 4–7 using end caps 16. The space 17 enclosing hollow-fiber membranes 8, 9 has an inlet arrangement 18 and an outlet arrangement 19, which are arranged in the base of the housing and in this representation extend downward perpendicular to the drawing plane. In the example illustrated, the flow through the hollow-fiber membranes 8, 9 of the two groups is in opposite directions. This is indicated by arrows 20, 21 and 22, 23, which point in the direction of flow.

Figure 2:
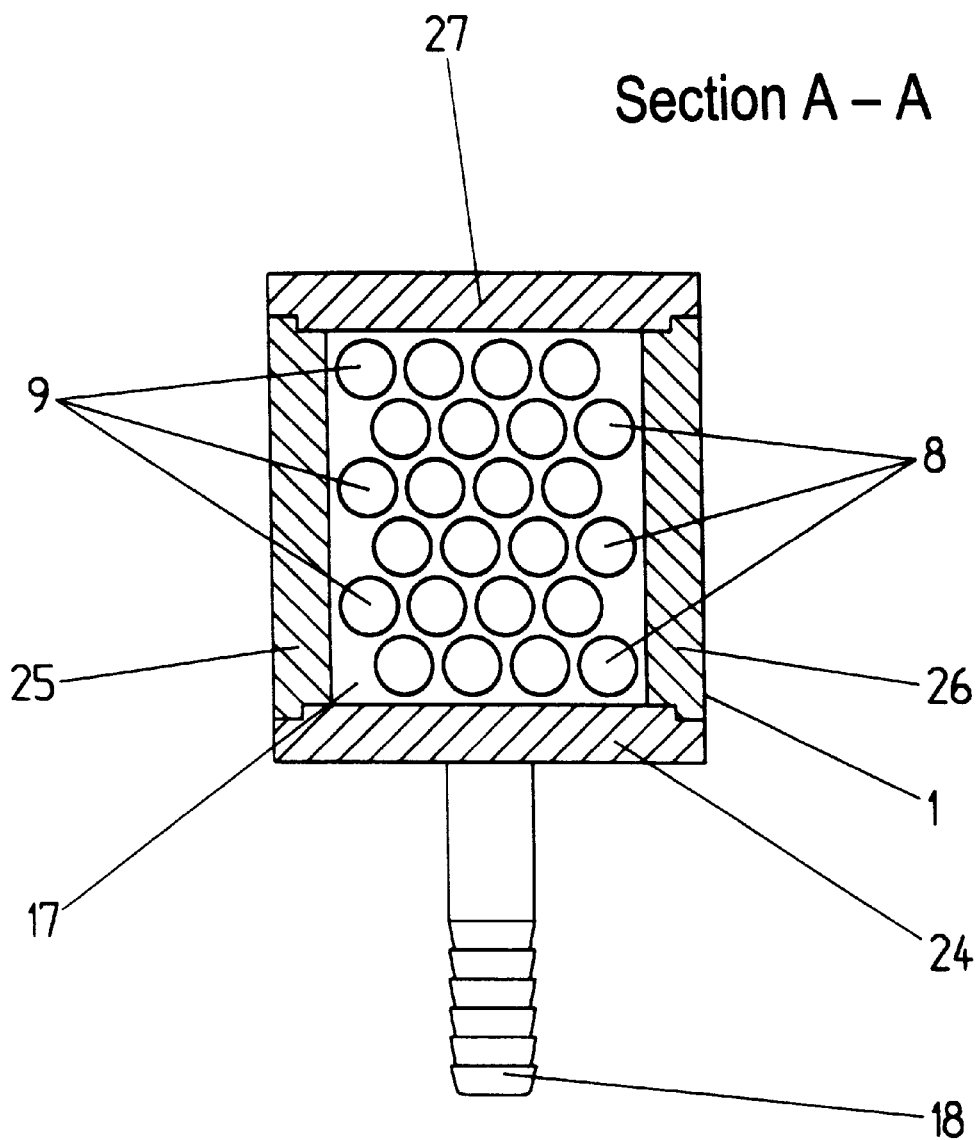
FIG. 2: shows cross section A—A through the membrane module according to the invention as shown in the FIG. 1.

FIG. 2 shows an enlarged view of a cross section through the housing middle section of the membrane module shown in FIG. 1, corresponding to the indicated section A—A. The base 24 and side walls 25, 26 form the channel-shaped housing middle section 1 with rectangular cross-section. Alternatively, of course, the housing middle section can consist of a single channel-shaped piece with rectangular or square cross-section. In the base 24 in this illustration, the inlet arrangement 18 can be seen in communication with the space 17 enclosing the hollow-fiber membranes. In the housing middle section the two groups of hollow-fiber membranes 8, 9 are layered in alternating sequence such that the cross section of the housing middle section is filled completely. The individual layers contain either only hollow-fiber membranes 8 of the first group or only hollow-fiber membranes 9 of the second group. The top of the housing middle section is closed with a covering device 27 in the form of a cover, which in the case illustrated has been attached by adhesive, for example. The cover is mounted after laying the hollow-fiber membranes into the housing middle section and the end pieces connected thereto.

Figure 3:
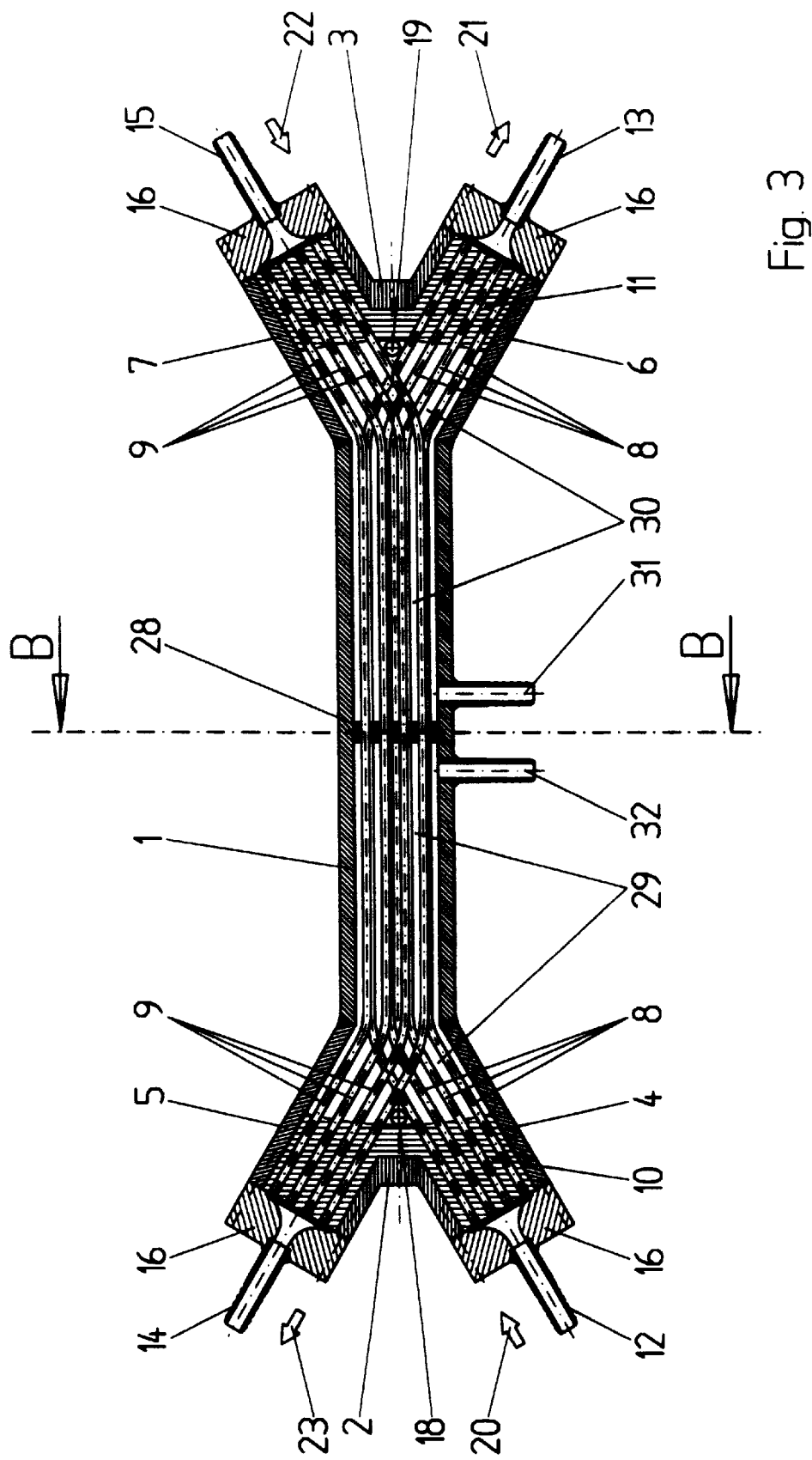
FIG. 3: shows a longitudinal section through a membrane module according to the invention, with two groups of hollow-fiber membranes and with a separation device that divides the enclosing space into two chambers.

In FIG. 3, a membrane module is illustrated that conforms to the structure of the module shown in FIG. 1, except that the membrane module of FIG. 3 has a separation device 28 in the housing middle section 1 along the longitudinal extent of the housing middle section 1. The separation device 28 at this point completely fills the cross-section of the housing middle section 1 enclosing the hollow-fiber membranes 8, 9 and thus divides the space enclosing the hollow-fiber membranes 8, 9 into two chambers 29, 30 that are separated from each other in a substantially fluid-tight manner. Each of the two chambers 29, 30 has an inlet arrangement 18 or 31 and an outlet arrangement 32 or 19, so that fluid can flow through them independently.

Figure 4:
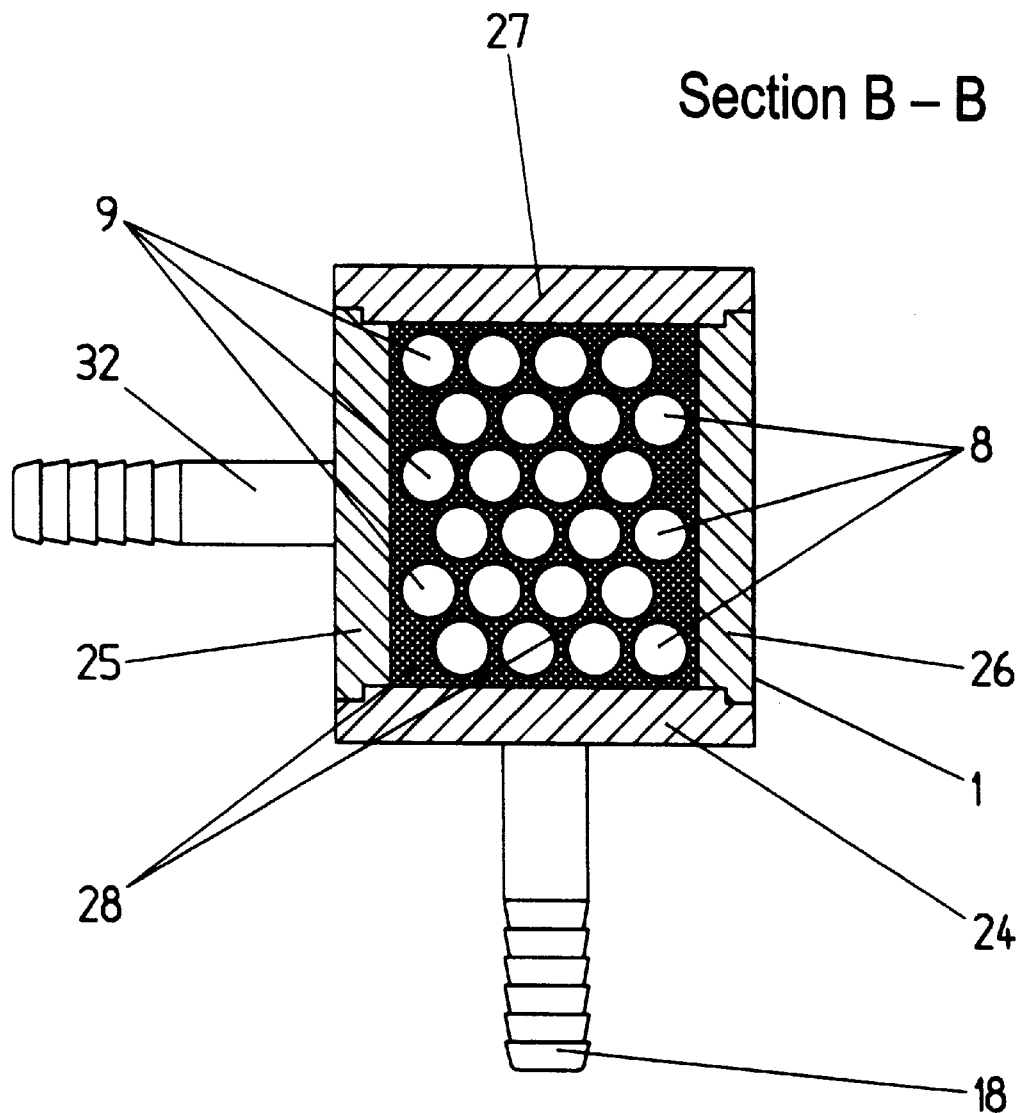
FIG. 4: shows cross section B—B through the membrane module according to the invention shown in FIG. 3.

Cross section B—B through the membrane module of FIG. 3 in the region of the separation device 28 is shown enlarged in FIG. 4. Again as in FIG. 2, two groups of hollow-fiber membranes 8, 9 have been inserted in layers in alternating sequence into the housing middle section, consisting of base 24 and side pieces 25, 26, such that the cross-section of the housing middle section is filled completely, whereby the individual layers contain either only hollow-fiber membranes 8 of the first group or only hollow-fiber membranes 9 of the second group. At its top, the housing middle section is closed by the covering device 27. The separation device 28 extends through the space enclosing the hollow-fiber membranes over the entire cross-section of the housing middle section and encloses the individual hollow-fiber membranes 8, 9.

Such a separation device 28 can readily be incorporated into housing middle section I when inserting the hollow-fiber membranes 8, 9 in layers, by initially applying a strip of a suitable epoxy resin, for example, to the base 24 of housing middle section 1, and then laying the first hollow-fiber membranes into the strip. Another strip of the resin is then applied at the same location, and this strip merges with the first strip and thus encloses the hollow-fiber membranes of the first layer. After positioning each layer of hollow-fiber membranes, a further resin strip is applied at the same location along the longitudinal extent of the housing middle section 1, into which the subsequent layer of hollow-fiber membranes is laid. A resin strip is also applied to the last hollow-fiber membrane layer and serves as a seal with respect to the covering device 27. In this manner, a fluid-tight division into two chambers of the space enclosing the hollow-fiber membranes 8, 9 along the longitudinal extent is achieved. The chamber located behind the separation device 28 as viewed, i.e., behind the drawing plane, has an inlet device 18 and an outlet device 32, via which a fluid can be introduced. The same applies to the chamber on this side of the separation device 28.

Figure 5:
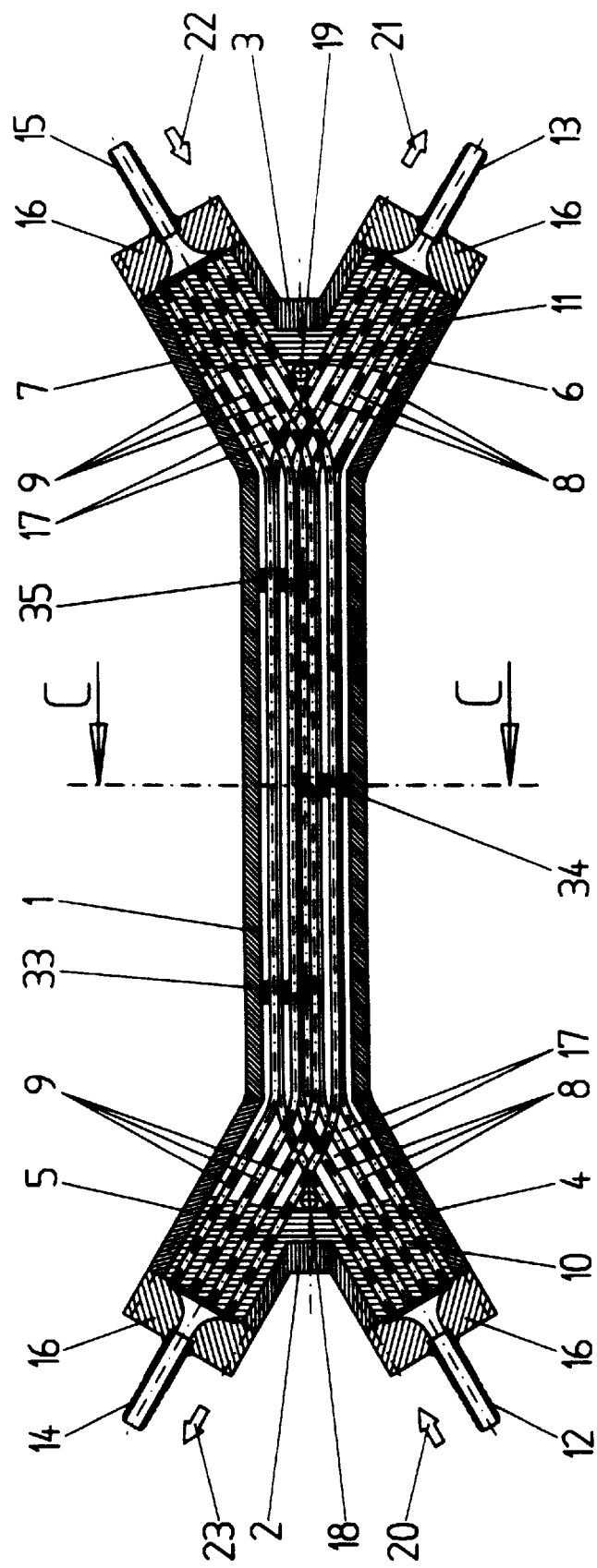
FIG. 5: shows a longitudinal section through a membrane module according to the invention, with two groups of hollow-fiber membranes and with separation devices extending over a portion of the housing width.

In FIG. 5, a membrane module is illustrated that conforms in its structure to the module shown in FIG. 1, but in the housing middle section 1 along the longitudinal extent of the housing middle section 1 has multiple separation devices 33, 34, 35, each of which fills the cross-section of the housing middle section 1 enclosing the hollow-fiber membranes over part of the width of the housing middle section 1. Through these separation devices 33, 34, 35, a fluid stream, introduced via the inlet arrangement 18 into the space 17 enclosing the hollow-fiber membranes and removed therefrom via the outlet arrangement 19 undergoes several changes of direction, and the flow directed in portions of the enclosing space 17 transversely to the hollow-fiber membranes improves the mass transfer on the outside of the hollow-fiber membranes.

Figure 6:
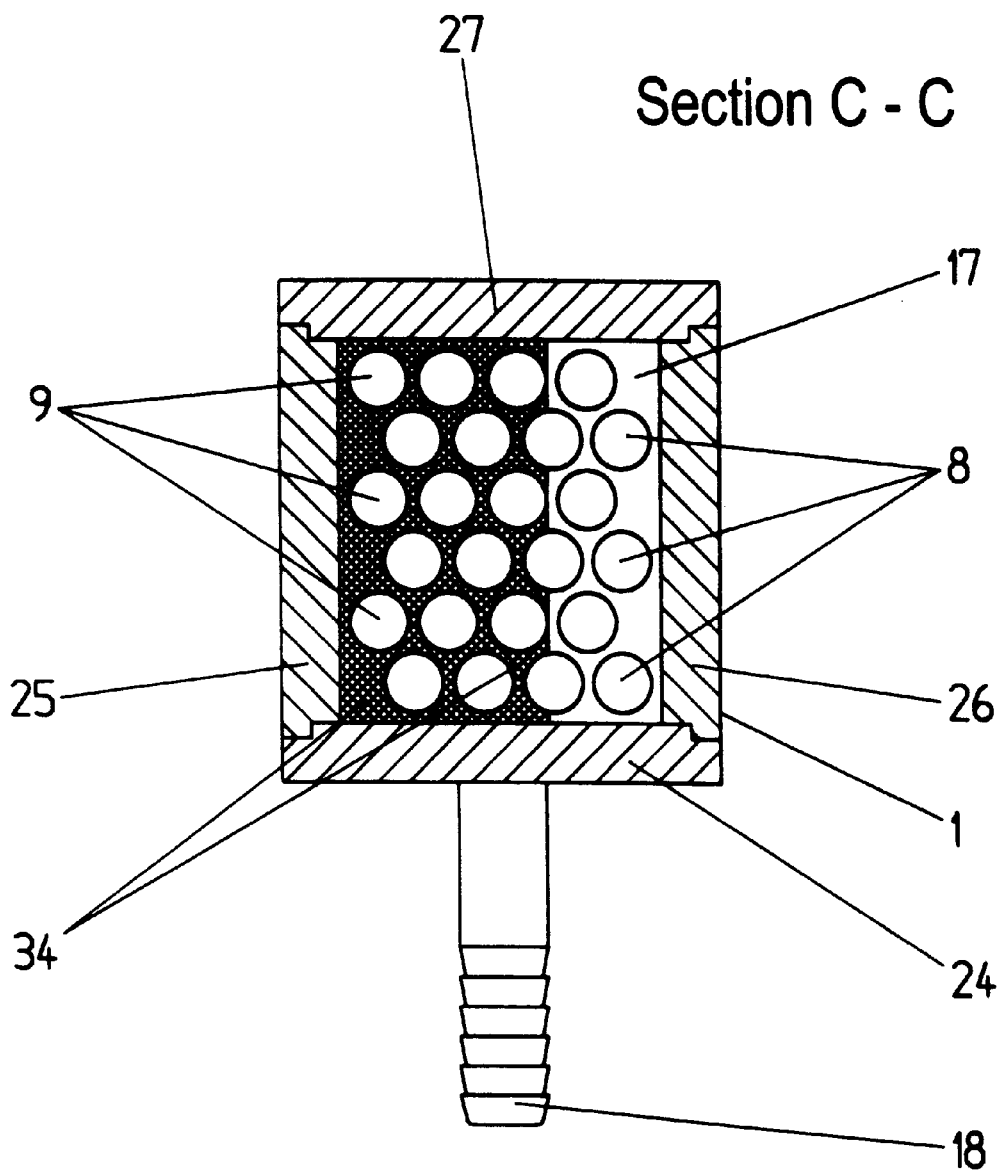
FIG. 6: shows cross section C—C through the membrane module according to the invention shown in FIG. 5.

FIG. 6 shows an enlarged view of the cross section of the membrane module of FIG. 5 at point C—C. The structure is identical to that shown in FIG. 2, but the space 17 enclosing the hollow-fiber membranes 8, 9 is occupied by the separation device 34 over part of the width of the housing middle section 1. At the separation device 34, the fluid introduced into the enclosing space via the inlet arrangement 18 can flow only through the free space 17 enclosing the hollow-fiber membranes at this point, resulting in changes of direction of the fluid stream before and after the separation device 34 in the direction of flow.

Alternatively, such a separation device can extend over the entire width of the housing middle section but only over part of the height or also over portions of the cross-section area of the housing middle section that are located at any desired position on the cross-section.

Figure 7:
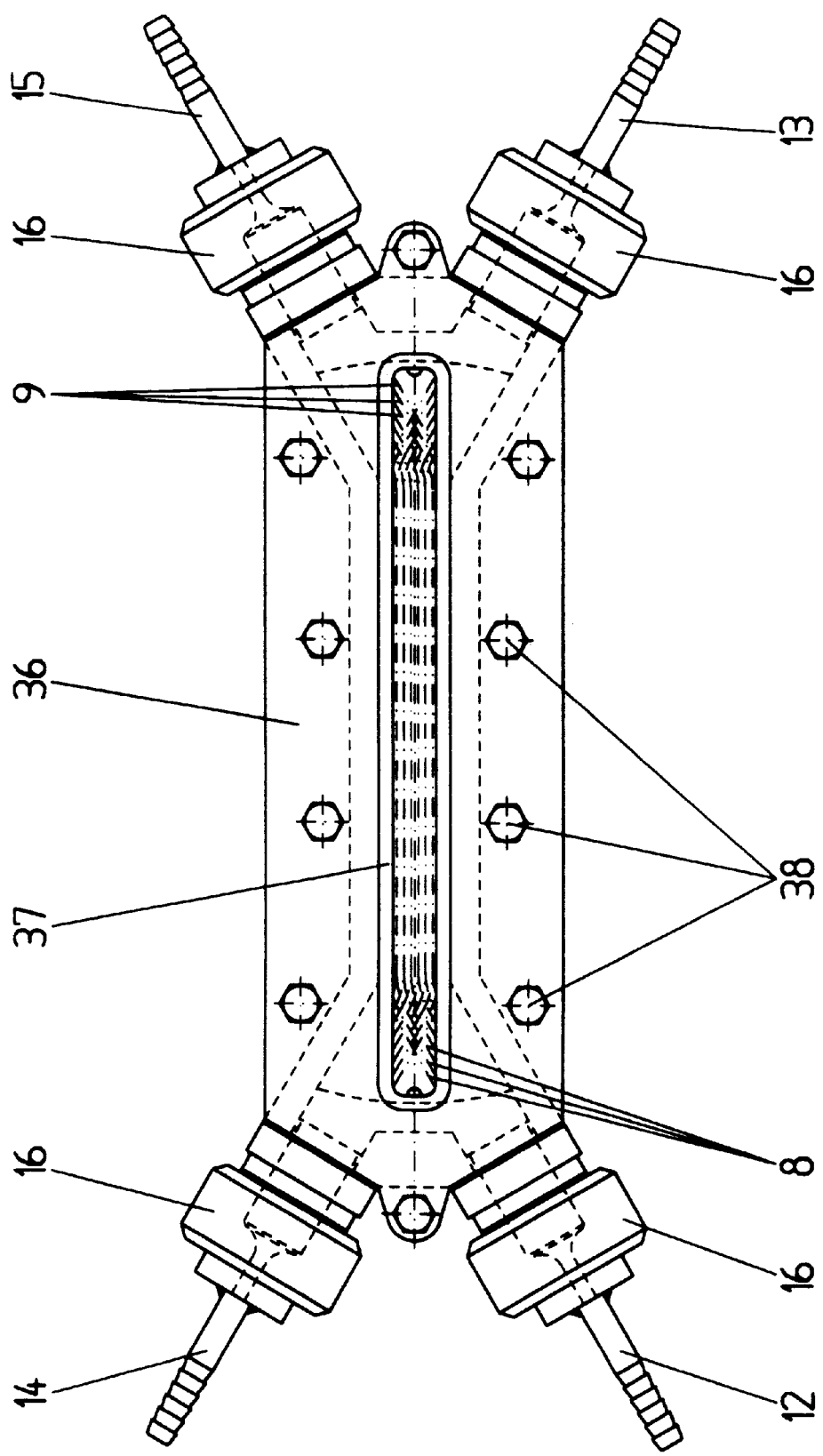
FIG. 7: is a plan view of a membrane module according to the invention, with a removable covering device.

FIG. 7 shows a membrane module according to the invention in plan view. The membrane module corresponds substantially to that shown in FIG. 1, and individual parts of the membrane module below the drawing plane are indicated by dashed lines. The membrane module of FIG. 7 has a removable covering device 36 into which a viewing window 37 has been incorporated above the housing middle section and portions of the end pieces. The hollow-fiber membranes running under the viewing window 37 are represented by the longitudinal axes indicated by dotted-dashed lines. The covering device 36 in this case is joined to the base by screws 38 to a plate—not shown—joined to the base of the housing middle section, such that the tops of the housing middle section and of the end pieces are sealed in a fluid-tight manner by the covering device 36. Such a covering device 36 can be removed again as desired, for example to replace the hollow-fiber membranes in the housing middle section and the end pieces.

The membrane modules according to the invention and the membrane modules produced using the process according to the invention can be used for a large number of applications, in which a wide variety of fluids—including particle-charged fluids—can be employed. The fluids in this case can be gases or liquids.

Preferably, the membrane modules according to the invention can be used in liquid-membrane technology for extraction, whereby a liquid acting as a liquid membrane is present in the space enclosing the hollow-fiber membranes, via which liquid, for example, a component to be extracted is transported from the hollow-fiber membranes of one group to the hollow-fiber membranes of a second group. An interesting application in this case is the separation of enantiomers, for example. Additional applications relate in general to extraction technology or gas separation from both gaseous and liquid media. The membrane modules according to the invention are also excellently suited in the fields of biotechnology or medical technology. In an especially preferred manner, they can be used for breeding or maintaining cell culture systems in which different material streams are to be directed to and from the system. For example, with a module according to the invention, with three groups of hollow-fiber membranes, a cell culture can reside in the space enclosing the hollow-fiber membranes, oxygen can be supplied via the first group of hollow-fiber membranes, a nutrient solution via the second group of hollow-fiber membranes, and waste products or specific substances produced by the cells removed via the third group of hollow-fiber membranes. Of course, a membrane module can also be used for such application that contains two groups of hollow-fiber membranes, where one of the groups consists of two subgroups. Therefore, the membrane modules according to the invention can in particular be employed as an artificial liver. Additional applications, for example, are the conservation of whole blood or the expansion/selection of stem cells or T cells for tumor therapy.

One of the groups can also be used solely for temperature control, i.e., for heat exchange, through which an appropriate liquid flows, and at least one additional group of hollow-fiber membranes used for the mass transfer. The membrane modules according to the invention can also be successfuilly employed in processes in which both mass transfer and separation processes occur, for example when oxygenation is required in conjunction with microfiltration or ultrafiltration. With some specific applications, cells can also be enclosed in the interior of the hollow-fiber membranes, i.e., in their lumina, and the cells supplied via the space enclosing the hollow-fiber membranes. In these cases, the affected hollow-fiber membranes are initially filled with the appropriate cell suspensions and then sealed.

The membrane modules according to the invention can also be advantageously employed for substance-specific treatments of fluids. Substance-specific treatments of fluids are understood to be treatments in which the fluid to be treated, containing certain substances or target substances, is brought into contact with a carrier material, on and/or in which functional groups or substances are immobilized that in a specific, selective manner interact with the target substance or substances contained in the fluid, i.e., with the substance that is the object of the substance-specific treatment. Such interactions can be, for example, cationic or anionic exchange, hydrophilic/hydrophobic interaction, hydrogen bridge formation, affinity, or enzymatic or catalytic reactions, and the like. In affinity separation of substances, such as in affinity chromatography, ligands are coupled to or immobilized in the carrier material and have the function of adsorptively binding a specific single target substance or an entire class of substances. This target substance is termed a ligate. One example of class-specific ligands are positively charged diethylaminoethyl (DEAE) groups or negatively charged sulfonic acid ($S0_3$) groups, which adsorb the class of positively charged or negatively charged molecules, respectively. Specific ligands are, for example, antibodies against a certain protein, which is bound as a ligate to the antibody.

A further example of substance-specific treatment is the extraction of active agents from cell suspensions in which genetically modified cells have generated substances such as antibodies, hormones, growth factors, or enzymes, usually in small concentrations. Important applications are the extracorporeal removal of undesired substances from human blood plasma and extraction of components such as immunoglobulins or clotting factors from donated blood plasma. Finally, another broad application area is the catalytic or biocatalytic—enzymatic—treatment of liquids, such as the hydrolysis of oils by lipases immobilized on a matrix.

Especially preferred substance-specific treatment processes are those for cleaning/separation of ligates from a ligate-containing liquid, where hollow-fiber membranes are contained in the membrane module according to the invention, on and/or in which ligands for these ligates are immobilized, or such ligands are present in the space enclosing the hollow-fiber membranes. Further preferred processes are those for catalytic treatment of liquids, whereby the membrane module according to the invention contains hollow-fiber membranes on and/or in which catalysts are immobilized, or such catalysts are present in the space enclosing the hollow-fiber membranes. The catalytic processes also include biocatalytic processes such as enzymatic processes. With respect to the usable ligands and catalysts, the possibilities of their immobilization, and various substance-specific treatments, see, for example, the discussions in EP-A-787523, express reference to the disclosure of which is hereby made.

Of course, the membrane modules according to the invention can also be employed for substance-specific treatment processes in which a carrier material, on and/or in which the functional groups or substances are immobilized, is present in the space enclosing the hollow-fiber membranes. The modules according to the invention can also be put to excellent use for processes in which multiple different substance-specific treatments are to be conducted, if different functional groups for attaining the various treatments are immobilized on and/or in the hollow-fiber membranes of the various groups and possibly in the enclosing space.

What is claimed is:

1. Process for assembling a membrane module with a housing middle section, containing at least two groups of hollow-fiber membranes, the groups arranged in layers and capable of being fed independently by fluids, wherein the hollow-fiber membranes within one group and the hollow-fiber membranes of different groups, at least in the housing middle section, are arranged substantially parallel to each other and each layer contains only hollow-fiber membranes of a single group, the process comprising:
   a) selecting as the housing middle section a channel-shaped housing middle section that is open at the top and the ends of which terminate in end pieces, also open at the top, each end piece having a number of arms corresponding to a total number of the groups of hollow-fiber membranes, wherein the housing middle section and the end pieces together form a housing shell,
   b) inserting the at least two groups of hollow-fiber membranes into the housing middle section and the end pieces, in each case in the form of layers superimposed such that the hollow-fiber membranes lie substantially in the direction of a longitudinal extent of the housing middle section and substantially parallel to each other, and terminate in the arms of the end pieces, wherein the ends of each different group of hollow-fiber membranes are arranged in respectively different arms of the respective end pieces,
   c) closing the housing middle section (1) and the end pieces (2,3) with a covering device, and
   d) embedding the ends of the hollow-fiber membranes at least in the arms of the end pieces with a sealing compound in such a manner that the hollow-fiber membranes penetrate the sealing compound with at least one of their ends and are open at this end, and that a space enclosing the hollow-fiber membranes is formed between the hollow-fiber membranes, an inner wall of the housing middle section, an inside of the covering device facing the housing middle section, and the sealing compound.

2. Process according to claim 1, wherein the covering device is in the form of a housing shell, into which the at least two groups of hollow-fiber membranes are inserted.

3. Process according to claim 1, wherein the housing middle section selected has a rectangular or square inside cross-section.

4. Process according to claim 1, wherein the housing middle section selected has a sector-shaped inside cross-section.

5. Process according to claim 1, wherein at least one group of hollow-fiber membranes consists of two subgroups of hollow-fiber membranes, wherein only hollow-fiber membranes of a single subgroup are arranged within each respective layer.

6. Process according to claim 5, wherein the hollow-fiber membranes of the at least one group are embedded such that they are open on only one end and the end pieces in which the open ends of hollow-fiber membranes of different subgroups are embedded are located at opposite ends of the housing middle section.

7. Process according to claim 1, wherein the hollow fiber membranes of the groups are embedded such that both of their ends penetrate the sealing compound and are open at both ends.

8. Process according to claim 1, wherein the hollow-fiber membranes are embedded such that the hollow-fiber membranes of at least one group are closed at one end and open at the other end.

9. Process according to claim 1, wherein the membrane module manufactured contains two groups of hollow-fiber membranes, arranged in layers and capable of being fed independently by fluids.

10. Process according to claim 1, wherein the hollow-fiber membranes of each group are each incorporated into hollow-fiber mats prior to insertion into the housing middle section.

11. Process according to claim 10, wherein the hollow-fiber membranes are incorporated into the respective hollow-fiber mats with textile threads.

12. Process according to claim 10, wherein the hollow-fiber mats are incorporated into woven mats.

13. Process according to claim 10, wherein the hollow-fiber mats are incorporated into knitted mats.

14. Process according to claim 10, wherein the hollow-fiber mats are stacked in layers.

15. Process according to claim 1, wherein the groups of hollow-fiber membranes are introduced into the housing middle section such that an alternating sequence of layers of the different groups of hollow-fiber membranes is obtained.

16. Process according to claim 10, wherein at least one arrangement of superimposed hollow-fiber mats, with one hollow-fiber mat for each group of hollow-fiber membranes, is arranged in superimposition, subsequently folded in a zigzag pattern parallel to the hollow-fiber membranes to form a stack, the stack thus obtained is inserted into the housing middle section, and the hollow-fiber membranes of different groups are introduced into different arms of the respective end pieces, the ends of the hollow-fiber mats having been previously separated by group.

17. Process according to claim 1, wherein the hollow-fiber membranes of adjacent layers are separated from each other by spacers.

18. Process according to claim 1, wherein separation devices oriented substantially perpendicular to the longitudinal extent of the housing middle section are arranged along the longitudinal extent in the space enclosing the hollow-fiber membranes.

19. Process for replacing hollow-fiber membranes in a membrane module containing at least two groups of hollow-fiber membranes, the groups arranged in layers and capable of being fed independently by fluids, wherein hollow-fiber membranes within one group as well as hollow-fiber membranes of different groups are arranged substantially parallel to each other and each layer contains only hollow-fiber membranes of a single group, the process comprising
   a) selecting a module having a housing with a removable covering device,
   b) removing the covering device prior to replacing the hollow-fiber membranes,
   c) removing the hollow-fiber membranes contained in the housing, together with the embedded portions at the ends of the hollow-fiber membranes, from the housing, and d) assembling the membrane module by the process according to claim 1.

20. Membrane module with a module housing, comprising a housing middle section with a longitudinal extent, terminating at its ends in end pieces each with at least two arms, wherein the module housing contains at least two groups of hollow-fiber membranes, capable of being fed independently by fluids and arranged in layers such that each layer contains only hollow-fiber membranes of a single group, the hollow-fiber membranes being arranged substantially in the direction of the longitudinal extent of the housing middle section and substantially parallel to each other, and the ends of the hollow-fiber membranes terminating in the arms of the end pieces, wherein the ends of the groups of hollow-fiber membranes are each arranged separately in different arms of the end pieces and the hollow-fiber membranes, at least in the arms of the end pieces, are embedded with a sealing compound such that at least at one of the ends of the hollow-fiber membranes penetrate the sealing compound and are open at this end, and wherein the open ends of the hollow-fiber membranes, separated by group, are each in communication with an inlet arrangement or an outlet arrangement, wherein the housing middle section and the end pieces with their arms are designed in the form of channels, open at the top and together constituting a housing shell, and wherein the housing middle section and end pieces are sealed in a fluid-tight manner with a covering device and a space enclosing the hollow-fiber membranes is thereby formed between the hollow-fiber membranes, an inner wall of the housing middle section, an inside of the covering device facing the housing middle section, and the sealing compound.

21. Membrane module according to claim 20, wherein the covering device is in the form of a housing shell, in which the layers of the groups of hollow-fiber membranes are arranged.

22. Membrane module according to claim 20, wherein the housing middle section has a rectangular or square inner cross-section.

23. Membrane module according to claim 20, wherein the housing middle section has a sector-shaped inner cross-section.

24. Membrane module according to claim 20, wherein the covering device is removable.

25. Membrane module according to claim 20, wherein at least one group of hollow-fiber membranes consists of at least two subgroups of hollow-fiber membranes, the groups arranged in layers.

26. Membrane module according to claim 25, wherein only hollow-fiber membranes of a single subgroup are contained in each respective layer, wherein the hollow-fiber membranes of the at least one group are embedded such that they are open only at one end, and wherein the end pieces in which the open ends of hollow-fiber membranes of different subgroups are embedded are located at opposite ends of the housing middle section.

27. Membrane module according to claim 20, wherein the hollow-fiber membranes are embedded such that each of the ends penetrates the sealing compound and is open, and the hollow-fiber membranes, separated by group, are in communication at one open end with an inlet arrangement and at the other open end with an outlet arrangement.

28. Membrane module according to claim 20, wherein the hollow-fiber membranes are embedded such that the hollow-fiber membranes of at least one group are closed at one end and open at the other end.

29. Membrane module according to claim 20, wherein two groups of hollow-fiber membranes are arranged in the membrane module.

30. Membrane module according to claim 20, wherein in the space enclosing the hollow-fiber membranes along the longitudinal extent of the housing middle section, the module has at least one separation device oriented substantially perpendicular to the longitudinal extent.

31. Membrane module according to claim 30, wherein the at least one separation device divides the enclosing space into separate chambers that are separated from each other in an at least substantially fluid-tight manner.

32. Membrane module according to claim 31, wherein at least one of the chambers has at least an inlet arrangement.

33. Membrane module according to claim 30, wherein at least one separation device extends over a portion of the cross-section area of the housing middle section.

34. Membrane module according to claim 20, wherein the membrane module contains an alternating sequence of layers of different groups of hollow-fiber membranes.

35. Membrane module according to claim 20, wherein the hollow-fiber membranes of each group are each incorporated into hollow-fiber mats.

36. Membrane module according to claim 35, wherein the hollow-fiber membranes are incorporated into the respective hollow-fiber mats with textile threads.

37. Membrane module according to claim 35, wherein the hollow-fiber mats are stacked in layers.

38. Process for separating enantiomers, comprising feeding a fluid containing enantiomers through the membrane module of claim 20.

39. Process for breeding or maintaining cell culture systems, comprising feeding through the membrane module of claim 20 at least one material stream that supports the breeding or maintaining of the cell culture system within the membrane module.

40. Process for substance-specific treatment of fluids, comprising feeding fluids requiring the substance-specific treatment through the membrane module of claim 20.

* * * * *

UNITED STATES PATENT AND TRADEMARK OFFICE
CERTIFICATE OF CORRECTION

PATENT NO. : 6,271,023 B1
DATED : August 7, 2001
INVENTOR(S) : Ulrich Baurmeister, Klaus Schneider and Rudolf Wollbeck It is certified that error appears in the above-identified patent and that said Letters Patent is hereby corrected as shown below:

<u>Column 4,</u>
Line 39, after "pound" insert -- . --.

<u>Column 9,</u>
Line 59, change "≦15°." to -- ≤15°. --.

<u>Column 15,</u>
Lines 8-9, change "drawings, in simplified schematic representation:" to -- drawings. --.

Signed and Sealed this

Twenty-eighth Day of May, 2002

Attest:

JAMES E. ROGAN
*Attesting Officer*     *Director of the United States Patent and Trademark Office*